United States Patent

Takamori

[11] Patent Number: 5,730,846
[45] Date of Patent: Mar. 24, 1998

[54] METHOD OF PRODUCING A MAGNETO-OPTICAL RECORDING MEDIUM

[75] Inventor: Nobuyuki Takamori, Nabari, Japan

[73] Assignee: Sharp Kabushiki Kaisha, Osaka, Japan

[21] Appl. No.: 798,796

[22] Filed: Feb. 11, 1997

Related U.S. Application Data

[62] Division of Ser. No. 402,518, Mar. 10, 1995, Pat. No. 5,635,309.

[30] Foreign Application Priority Data

Mar. 24, 1994 [JP] Japan .................. 6-54063

[51] Int. Cl.$^6$ .................. C23C 14/34
[52] U.S. Cl. .................. 204/192.2; 204/192.26; 427/131; 427/162
[58] Field of Search .................. 204/192.2, 192.26; 427/124, 126.1, 131, 162

[56] References Cited

U.S. PATENT DOCUMENTS

| | | | |
|---|---|---|---|
| 4,670,356 | 6/1987 | Sato et al. | 428/693 |
| 4,749,628 | 6/1988 | Ahlert et al. | 428/660 |
| 4,871,614 | 10/1989 | Kobayashi | 428/336 |
| 5,082,749 | 1/1992 | Carcia | 428/694 |
| 5,173,885 | 12/1992 | Iiyori et al. | 369/13 |
| 5,233,575 | 8/1993 | Uchino et al. | 369/13 |
| 5,239,534 | 8/1993 | Matsumoto | 359/288 |
| 5,436,072 | 7/1995 | Hatwar et al. | 478/336 |
| 5,441,804 | 8/1995 | Akitake et al. | 428/336 |
| 5,473,582 | 12/1995 | Sato | 369/13 |

FOREIGN PATENT DOCUMENTS

| | | |
|---|---|---|
| 2010014 | 8/1990 | Canada . |
| 0210855 A2 | 7/1986 | European Pat. Off. . |
| 0 383 216 | 8/1990 | European Pat. Off. . |
| 0 428 128 | 5/1991 | European Pat. Off. . |
| 60-98611 | 6/1985 | Japan . |
| 273636 | 11/1987 | Japan . |
| 1-23927 | 5/1989 | Japan . |
| 3-181041 | 8/1991 | Japan . |
| 3-209647 | 9/1991 | Japan . |
| 4-65523 | 10/1992 | Japan . |
| 5-70922 | 10/1993 | Japan . |
| 6-187681 | 7/1994 | Japan . |

*Primary Examiner*—Aaron Weisstuch
*Attorney, Agent, or Firm*—David G. Conlin; George W. Neuner

[57] ABSTRACT

An amorphous magnetic thin film of TbDyFeCo alloy is described, which is a multi-layer film formed by alternatively laminating a TbFeCo layer and a DyFeCo layer on a substrate and has an axis of easy magnetization perpendicular to a film surface, wherein, when the composition of the magnetic thin film is represented by $Tb_xDy_y(Fe_{1-z}Co_z)_{1-(x+y)}$ and when x, y, and z are within ranges of $0<x\leq0.12$, $0<y\leq0.12$, and $0<z\leq0.30$, a condition to be satisfied by x and y is $0.25\leq x/(x+y)$. Consequently, an inexpensive magneto-optical recording medium with an improved C/N ratio is manufactured.

9 Claims, 4 Drawing Sheets

METHOD OF PRODUCING A MAGNETO-OPTICAL RECORDING MEDIUM

CROSS REFERENCE TO RELATED APPLICATIONS

This is a divisional of application Ser. No. 08/402,518 filed on Mar. 10, 1995, now U.S. Pat. No. 5,635,309.

FIELD OF THE INVENTION

The present invention relates to a magneto-optical recording medium on/from which information is recorded, reproduced and erased by laser light, and to a method of producing the magneto-optical recording medium.

BACKGROUND OF THE INVENTION

In recent years, research and development of optical memory devices have been actively carried out to meet various demands, for example, high-density recording, large memory capacity, and high-speed access. In particular, a magneto-optical magnetic thin film using a magnetic film with an axis of easy magnetization perpendicular to a film surface is utilized for a magneto-optical recording medium for use in the optical memory devices.

The following are conventionally well known magneto-optical magnetic thin films. Polycrystal thin films such as MnBi and MnCuBi. Amorphous thin films such as GdTbFeCo, TbFeCo, TbDyFeCo, DyFeCo, GdTbFe, GdDyFe, GdFeCo, TbFe, DyFe, GdFe and GdCo. Compound monocrystal thin films, for example, GIG.

Among these magneto-optical magnetic thin films, the amorphous thin films are suitable for magneto-optical recording media. The reason for this is that the amorphous thin films are practical because the thin films with a large area are manufactured at temperatures in the vicinity of room temperature and that the amorphous thin films are writable and readable, for example, by a practical semiconductor (GaAlAs) laser.

Table 1, below, shows the relation between the amorphous thin film and the Kerr rotation angle (degree) as an index of performance.

TABLE 1

| Material | Kerr Rotation Angle (degree) |
| --- | --- |
| TbFeCo | 0.38 |
| TbDyFeCo | 0.37 |
| DyFeCo | 0.35 |
| GdTbFeCo | 0.40 |
| GdFeCo | 0.43 |

As shown in Table 1, TbFeCo and GdFeCo exhibited large Kerr rotation angles. Namely, it is found that these amorphous thin films are suitable for use in magneto-optical recording media.

In order to achieve high-density recording, various amorphous thin films with compositions which decrease the writing magnetic field, i.e., increase the perpendicular magnetic anisotropic energy have been proposed.

There is a thin film of amorphous TbFeCo with a composition which gives the highest C/N (carrier-to-noise) ratio even when the writing bit length (recording bit length) is around 0.76 μm. This is achieved because the perpendicular magnetic anisotropic energy of TbFeCo is large. Table 2 below shows the relation between the perpendicular magnetic anisotropic energy (Ku) and the C/N ratio of magneto-optical magnetic thin films.

TABLE 2

| Material | Ku (erg/cm$^3$) | C/N Ratio (dB) |
| --- | --- | --- |
| TbFeCo | $6.5 \times 10^5$ | 49.2 |
| DyFeCo | $4.5 \times 10^5$ | 46.5 |
| GdTbFeCo | $3.2 \times 10^5$ | 46.0 |
| GdFeCo | $1.9 \times 10^5$ | 45.0 |

As shown in Table 2, TbFeCo which exhibits a Kerr rotation angle smaller than that of GdFeCo gives a greater perpendicular magnetic anisotropic energy and an improved C/N ratio. Thus, in order to improve the C/N ratio, it is necessary to increase the perpendicular magnetic anisotropic energy rather than the Kerr rotation angle shown in Table 1. Namely, the value of the perpendicular magnetic anisotropic energy is predominant over the degree of the Kerr rotation angle for improving the C/N ratio.

However, if TbFeCo is used as a magneto-optical magnetic thin film, the price of the magneto-optical recording medium is increased because Tb (terbium) is most expensive among rare-earth elements. Furthermore, if DyFeCo which is inexpensive and has relatively large perpendicular magnetic anisotropic energy is used as the magneto-optical magnetic thin film, the magneto-optical recording medium suffers from another problem that the C/N ratio is impaired.

Then, in order to maintain the C/N ratio at a practical level and to prevent an increase in the price, for example, Japanese Publication of Unexamined Patent Application No. 3-209647 discloses a magneto-optical recording medium using a magneto-optical magnetic thin film of a quaternary alloy including DyFeCo plus Tb.

However, in this magneto-optical recording medium, the composition of TbDyFeCo was selected so that the coercive force is not larger than 5 kOe so as to increase the sensitivity of the recording magnetic field. Therefore, a multiplicity of errors occurred after a durability test in which around 106 cycles of recording, reproduction, and erasing operations were performed on the magneto-optical recording medium.

SUMMARY OF THE INVENTION

An object of the present invention is to provide an inexpensive magneto-optical recording medium using a magneto-optical magnetic thin film of a quarternary alloy including TbDyFeCo, which is capable of maintaining the C/N ratio at a practical level and reducing the occurrence of errors after a durability test, and a method of manufacturing the magneto-optical recording medium.

In order to achieve the above objects, a magneto-optical recording medium of the present invention includes:

a substrate; and a quaternary alloy thin film including amorphous terbium, dysprosium, iron, and cobalt formed on the substrate, the quaternary alloy having an axis of easy magnetization perpendicular to a film surface, wherein, when a composition of the quaternary alloy thin film is represented by $Tb_xDy_y(Fe_{1-z}Co_z)_{1-(x+y)}$ and when x, y, and z are within ranges of $0<x\leq0.12$, $0<y\leq0.12$, and $0<z\leq0.30$, a condition to be satisfied by x and y is $0.25\leq x/(x+y)$.

With this structure, when the composition of the quaternary alloy thin film is represented by $Tb_xDy_y(Fe_{1-z}Co_z)_{1-(x+y)}$ and when x, y, and z are within ranges of $0<x\leq0.12$, $0<y\leq0.12$, and $0<z\leq0.30$, if a condition to be satisfied by x and y is $0.25\leq x/(x+y)$, the magnetization is stably oriented in a direction perpendicular to the film surface and the C/N ratio is maintained at a practical level.

As a result, the minimum Tb content of the TbDyFeCo alloy thin film for keeping the C/N ratio at a practical level is found. It is therefore possible to manufacture an inexpensive magneto-optical recording medium with an improved C/N ratio.

Moreover, with the magneto-optical recording medium having a TbDyFeCo alloy thin film of the above-mentioned composition, since the coercive force is not lower than 6 kOe at room temperature, it is possible to prevent a multiplicity of errors from occurring after a durability test in which $10^6$ cycles of recording, reproduction, and erasing operations are performed.

For a fuller understanding of the nature and advantages of the invention, reference should be made to the ensuing detailed description taken in conjunction with the accompanying drawings.

DESCRIPTION OF THE PREFERRED EMBODIMENTS

The following description discusses one embodiment of the present invention with reference to FIGS. 1 to 5.

Figure 1:
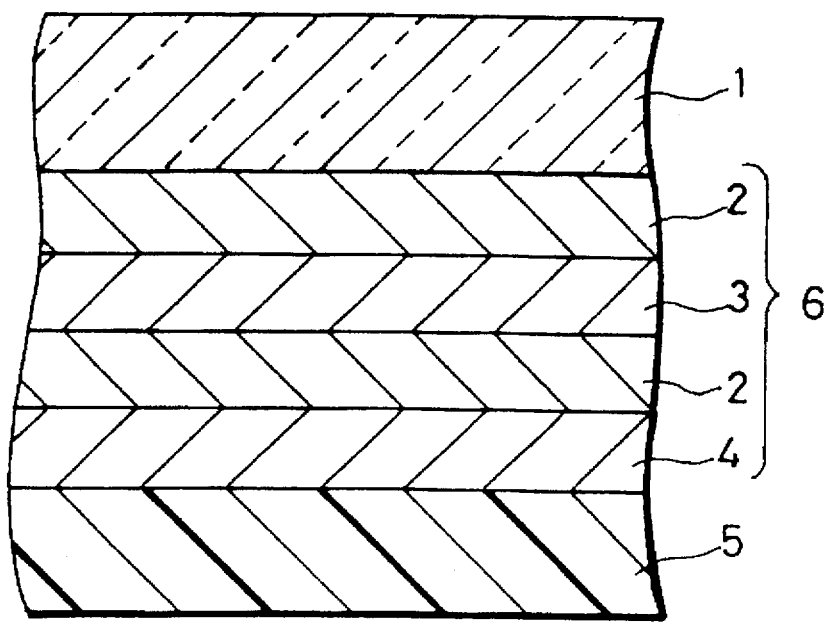
FIG. 1 is a schematic drawing showing the structure of a magneto-optical recording medium according to one embodiment of the present invention.

As illustrated in FIG. 1, a magneto-optical disk (magneto-optical recording medium) of this embodiment has a magneto-optical recording film 6 and a protective coating film 5 formed on one side of a substrate 1. The substrate 1 is made of an optically transparent material such as, for example, glass or polycarbonates.

The magneto-optical recording film 6 is a recording layer for recording information. The magneto-optical recording film 6 is formed by laminating four layers, i.e., a dielectric film 2, an amorphous magnetic film 3, a dielectric film 2 and a reflective film 4 in this order on the substrate 1. More specifically, the dielectric film 2 is 100 nm in film thickness and made of AlN. The amorphous magnetic thin film 3 is 30 nm in film thickness and made of TbDyFeCo. The dielectric film 2 is 30 nm in film thickness and made of AlN. The reflective film 4 is 50 nm in film thickness.

Figure 2:
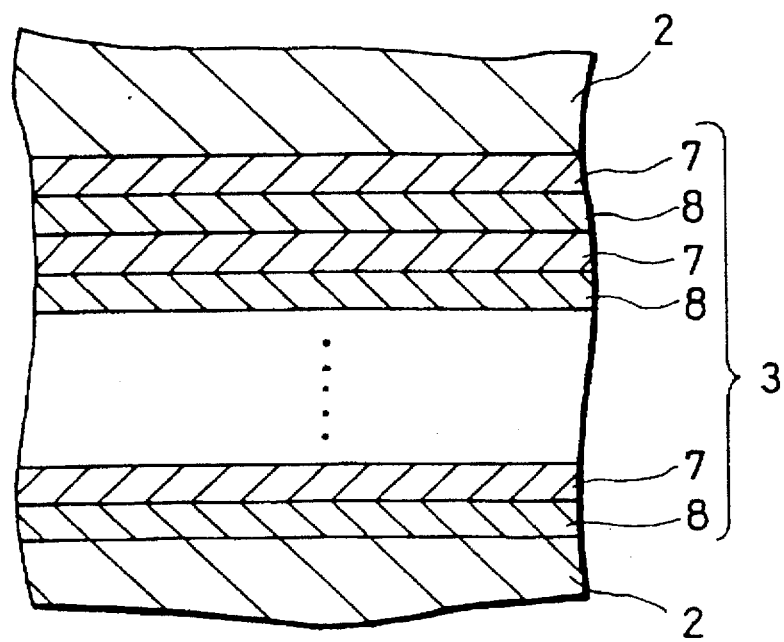
FIG. 2 is a schematic drawing showing the structure of an amorphous magnetic thin film in the magneto-optical recording medium shown in FIG. 1.

The amorphous magnetic thin film 3 is formed by a thin film of an amorphous quaternary alloy including amorphous terbium, dysprosium, iron, and cobalt (hereinafter referred to as the TbDyFeCo alloy thin film) having an axis of easy magnetization perpendicular to a film surface. As illustrated in FIG. 2, the amorphous magnetic thin film 3 is a multilayer film formed by repeatedly alternately laminating a TbFeCo layer (2.5 Å in thickness) and a DyFeCo layer 8 (2.5 Å in thickness).

Therefore, in the amorphous magnetic thin film 3, by repeatedly alternately laminating the TbFeCo layer 7 and the DyFeCo layer 8 as mentioned above, a Tb-rich layer and a Dy-rich layer of the TbDyFeCo alloy thin film alternately appear in the direction of film thickness.

When the composition of the TbDyFeCo alloy thin film is represented by $Tb_xDy_y(Fe_{1-z}Co_z)_{1-(x+y)}$, if x, y, and z are within ranges $0<x\leq0.12$, $0<y\leq0.12$, and $0\leq z\leq0.30$, the magnetization is stably oriented to a direction perpendicular to the film surface. Additionally, if z is $0.3<z$, since the dependence of the Curie temperature or compensation temperature on composition becomes larger, the film becomes impracticable. On the other hand, if x and y are not in the above-mentioned ranges, it becomes difficult to stably orient the magnetization to a direction perpendicular to the film surface. Consequently, practical recording and reproduction characteristics can not be obtained.

Figure 4:
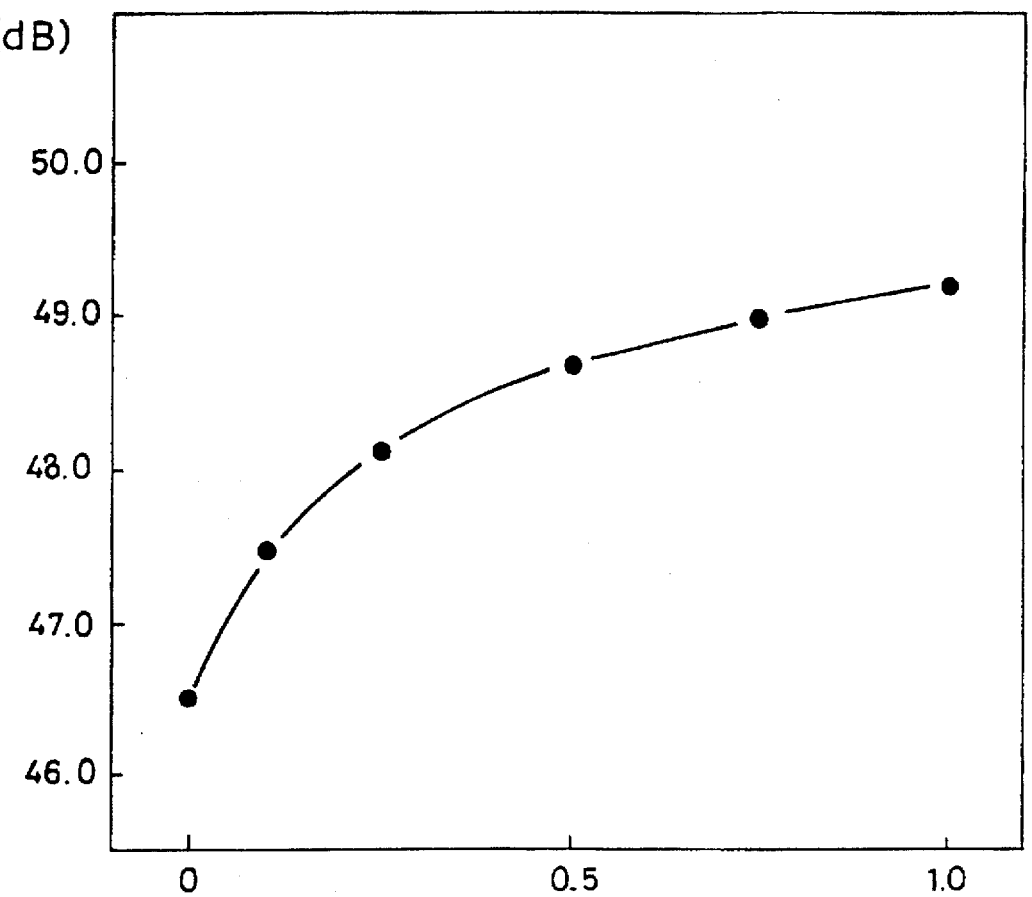
FIG. 4 is a graph showing the relation between the Tb content of the amorphous magnetic thin film and the C/N ratio.

Table 3 and FIG. 4 show the C/N ratio when x, y, and z of $Tb_xDy_y(Fe_{1-z}Co_z)_{1-(x+y)}$ were within the above-mentioned ranges and the composition of the TbDyFeCo alloy thin film was $(Tb_xDy_y)_{0.215}(Fe_{1-z}Co_z)_{0.785}$. The C/N ratio was measured using films prepared by a dc sputtering device by performing sputtering using a TbDyFeCo alloy target while varying x, y, and z, where x represents the Tb amount, y is the Dy amount, and z is the Co amount.

x/(x+y) indicates the ratio of Tb amount in the TbDy alloy. z was adjusted so that the Curie temperature became 200° C. in the respective compositions of the TbDyFeCo alloy thin films.

TABLE 3

| FILM COMPOSITION | | |
|---|---|---|
| x/(x + y) | z | C/N Ratio (dB) |
| 0 | 0.20 | 46.5 |
| 0.10 | 0.19 | 47.5 |
| 0.25 | 0.17 | 48.1 |
| 0.47 | 0.14 | 48.7 |
| 0.50 | 0.135 | 48.7 |
| 0.75 | 0.10 | 49.0 |
| 1.00 | 0.07 | 49.2 |

As shown in Table 3 and FIG. 4, the relation between the Tb amount and the C/N ratio is not necessarily linear, and can be non-linear so that the C/N ratio becomes nearly saturated when x/(x+y) is not less than about 0.25. Accordingly, if x/(x+y) is at least 0.25, the C/N ratio is maintained at a practical level. Namely, if TbDy contains at least 25% Tb, the C/N ratio attains a practical level.

Therefore, the minimum Tb content of the TbDyFeCo alloy thin film for holding the C/N ratio at a practical level is found. It is thus possible to manufacture an inexpensive magneto-optical recording medium with a large C/N ratio.

Moreover, in a magneto-optical recording medium using a thin film of TbDyFeCo alloy with any of the above-mentioned compositions, the coercive force does not become lower than 6 kOe at room temperature. It is therefore possible to prevent a multiplicity of errors from occurring after the durability test in which $10^6$ cycles of recording, reproduction, and erasing operations are performed.

Figure 3:
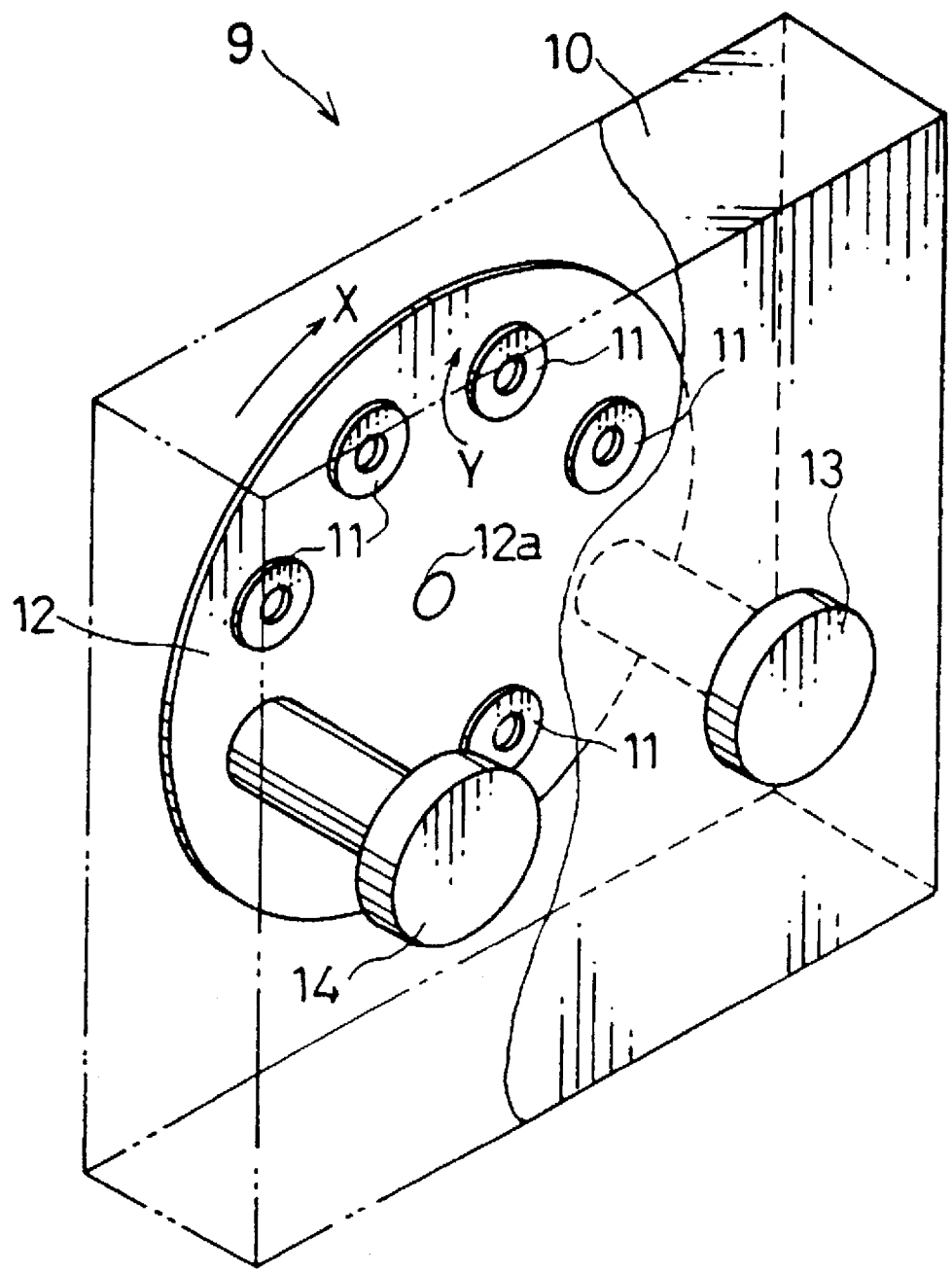
FIG. 3 is a schematic drawing showing the structure of a revolving sputtering device for forming the amorphous magnetic thin film shown in FIG. 2.

The dielectric film 2 and the reflective film 4 are formed by a sputtering method using a vacuum device (not shown)

or a deposition method, while the amorphous magnetic thin film 3 is formed, for example, by a revolving sputtering device 9 shown in FIG. 3.

As illustrated in FIG. 3, the revolving sputtering device 9 includes a cage-like sputtering chamber 10 having therein a palette 12, a TbFeCo target 13, and a DyFeCo target 14.

A plurality of workpieces 11 are set on the palette 12. Each of the workpieces 11 includes the substrate 1 and the dielectric layer 2 formed thereon. The palette 12 is rotated on a shaft 12a in the direction of arrow x by driving means, not shown. Meanwhile, the workpieces 11 set on the palette 12 are rotated in the direction of arrow Y. Namely, the palette 12 revolves on the shaft 12a, while the workpieces 11 revolve around the shaft 12a.

The workpieces 11 are disposed on the palette 12 so that they are positioned on the apexes of an equilateral polygon whose center is located on the shaft 12a. The TbFeCo target 13 and the DyFeCo target 14 are disposed on any two opposite apexes of the equilateral polygon. Namely, when the TbFeCo target 13 is positioned to face one of the apexes of the equilateral polygon, the DyFeCo target 14 faces an other apex thereof. With this arrangement, when the workpiece 11 is moved to the position facing the TbFeCo target 13 by the revolution of the palette 12, the TbFeCo layer is sputtered. Then, when the workpiece 11 is moved to the position facing the DyFeCo target 14, the DyFeCo layer is sputtered.

More specifically, the amorphous magnetic thin film 3 is formed by repeatedly alternately laminating the TbFeCo layer 7 and the DyFeCo layer 8 in the direction of film thickness. The TbFeCo layer 7 and the DyFeCo layer 8 are formed by simultaneously sputtering the two targets for about 120 seconds by discharging the TbFeCo target 13 and the DyFeCo target 14 with respect the workpieces 11 including the substrate 1 and the dielectric film 2 formed thereon while revolving the workpieces 11 in the direction of arrow x around the shaft 12a at a revolving speed of about 30 rpm and simultaneously revolving each of the workpieces 11 on its own axis.

Consequently, a total of thirty TbFeCo layers 7 and thirty DyFeCo layers 8 are fomed. As a result, the amorphous magnetic thin film 3 becomes a multi-layer film with 60 layers. In this case, $Tb_{21}(Fe_{90}Co_{10})_{79}$ is used as the TbFeCo target 13, and $Dy_{22}(Fe_{82}Co_{18})_{78}$ is used as the DyFeCo target 14.

The perpendicular magnetic anisotropic energy (Ku) and the C/N ratio of a magneto-optical recording medium using the above multi-layer TbDyFeCo alloy thin film and of a magneto-optical recording medium using a TbDyFeCo alloy thin film having evenly mixed Tb, Dy, Fe, and Co were measured. The results are shown in Table 4. In this case, the thin films of magnetic alloys were arranged to have the same composition. $(Tb_{0.46}Dy_{0.54})_{0.215}(Fe_{0.86}Co_{0.14})_{0.785}$.

TABLE 4

| MAGNETIC FILM STRUCTURE | Ku(erg/cm³) | C/N Ratio(dB) |
| --- | --- | --- |
| TbDyFeCo Alloy Thin Film | $6.0 \times 10^5$ | 48.7 |
| TbFeCo/DyFeCo Multi-layer Film | $6.3 \times 10^5$ | 49.0 |

As shown in Table 4, the multi-layer TbDyFeCo alloy thin film (TbFeCo/DyFeCo multi-layer film) had an increased Ku and an improved C/N ratio compared with the evenly mixed TbDyFeCo alloy thin film. Namely, when the amorphous magnetic thin film 3 made of the TbDyFeCo alloy thin film is arranged to be a multi-layer film having the Tb-rich layer and the Dy-rich layer alternately in the direction of film thickness, Ku is increased.

Therefore, when the TbDyFeCo alloy thin film has a composition represented by $Tb_xDy_y(Fe_{1-z}Co_z)_{1-(x+y)}$ where x, y, and z are within ranges $0<x\leq 0.12$, $0<y\leq 0.12$, and $0<z\leq 0.30$, if a condition to be satisfied by x and y is $0.25 \leq x/(x+y)$ and if the TbDyFeCo alloy thin film is a multi-layer film formed by the TbFeCo layers and the DyFeCo layers, the C/N ratio is held at a practical level with the minimum Tb amount. It is thus possible to reduce the manufacturing cost and provide a magneto-optical recording medium showing satisfactory results in the durability test.

Moreover, it is known that, when the number of laminated layers forming the TbDyFeCo alloy thin film is about twenty, i.e., when the number of the TbFeCo layers 7 and of the DyFeCo layers 8 are each ten, the perpendicular magnetic anisotropic energy is increased compared with the evenly mixed TbDyFeCo alloy thin film. If the number of laminated layers is less than twenty, there is substantially no difference in the perpendicular magnetic anisotropic energy between the multi-layer TbDyFeCo alloy thin film and the evenly mixed TbDyFeCo alloy thin film.

In this embodiment, therefore, the TbDyFeCo alloy thin film is formed by 60 layers of alternately laminated TbFeCo layers 7 and the DyFeCo layers 8. However, it is not necessary to limit the number of laminated layers to sixty. Considering the above-mentioned results, the number of laminated layers is desired to be set not less than twenty.

Figure 5:
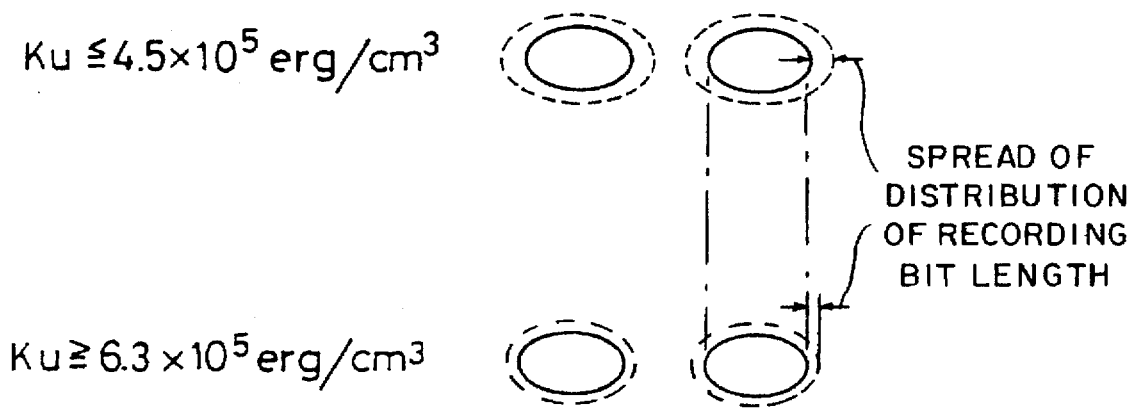
FIG. 5 shows the correlation between the perpendicular magnetic anisotropic energy (Ku) and the shape of recording bit, and explains the change in shape of recording bit from $K\leq$ than $4.5\times10^5$ erg/cm$^3$ to $Ku\geq6.3\times10^5$ erg/cm$^3$.

Table 5 and FIG. 5 show the relation between the perpendicular magnetic anisotropic energy (Ku) and the distribution of recording bit length. In this case, the average recording bit length was 650 nm. A Ku of $4.5 \times 10^5$ (erg/cm³) was obtained by the DyFeCo alloy thin film. A Ku of $6.0 \times 10^5$ (erg/cm³) was obtained by the (evenly mixed) TbDyFeCo alloy thin film. A Ku of $6.3 \times 10^5$ (erg/cm³) was obtained by the (multi-layer) TbDyFeCo alloy thin film.

TABLE 5

| Ku (erg/cm³) | STANDARD DEVIATION OF RECORDING BIT LENGTH (nm) |
| --- | --- |
| $4.5 \times 10^5$ | 58.5 |
| $6.0 \times 10^5$ | 26.0 |
| $6.3 \times 10^5$ | 22.5 |

Average bit length: 650 nm

As shown in Table 5, when Ku becomes larger, the standard deviation of the recording bit length becomes smaller, i.e., when Ku becomes smaller, the standard deviation of the recording bit length becomes larger. Namely, as illustrated in FIG. 5, when Ku is not larger than $4.5 \times 10^5$ (erg/cm³), the distribution of the recording bit length spreads over the area shown by the broken line. Whereas, as illustrated in FIG. 5, when Ku is not smaller than $6.3 \times 10^5$ (erg/cm³), the distribution of the recording bit length becomes smaller.

It is found that the distribution of the recording bit length becomes smaller with an increase of Ku. Moreover, as shown in Tables 2 and 4, since it is generally considered that the C/N ratio is improved with an increase of Ku, if the distribution of the recording bit length is made even, the C/N ratio is also improved. In addition, the recording density of the magneto-optical recording medium is improved by the even distribution of the recording bit length.

Thus, by using the multi-layer TbDyFeCo alloy thin film with large Ku as the amorphous magnetic thin film 3, the recording density of the magneto-optical recording is improved and the C/N ratio is increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing a magneto-optical recording medium, said method comprising the step of forming a quaternary alloy thin film including amorphous terbium, dysprosium, iron, and cobalt on a substrate by repeatedly forming a plurality of alternating layers of TbFeCo and DyFeCo by sputtering by alternating the use of a TbFeCo target and a DyFeCo target, said quaternary alloy thin film having an axis of easy magnetization perpendicular to the film surface.

2. The method of manufacturing a magneto-optical recording medium according to claim 1, further comprising the step of placing said substrate on at least one of the apexes of an equilateral polygon whose center is positioned on the rotation axis of a rotating palette, wherein said TbFeCo target and said DyFeCo target are disposed so that, when said TbFeCo target faces one of the apexes of said equilateral polygon, said DyFeCo target faces the other apex thereof.

3. The method according to claim 1, wherein the quaternary alloy thin film comprises at least 10 layers each of DyFeCo and TbFeCo.

4. The method according to claim 1, wherein the composition of the quaternary alloy thin film is represented by $Tb_xDy_y(Fe_{1-z}Co_z)_{1-(x+y)}$, wherein x, y, and z are within the ranges $0<x\leq0.12$, $0<y\leq0.12$, and $0<z\leq0.30$, and wherein x and y satisfy $0.25\leq x/(x+y)$.

5. The method according to claim 1 wherein, in the composition formula $Tb_xDy_y(Fe_{1-z}Co_z)_{1-(x+y)}$, $x+y=0.215$.

6. The method according to claim 1, wherein the quaternary alloy thin film has a Curie temperature of about 200° C.

7. The method according to claim 1, wherein the quaternary alloy thin film has a coercive force not less than 6 kOe.

8. A method of manufacturing a magneto-optical recording medium, said method comprising the step of forming a quaternary alloy thin film including amorphous terbium, dysprosium, iron, and cobalt on a substrate by repeatedly depositing a plurality of alternating layers of TbFeCo and DyFeCo, said quaternary alloy thin film having an axis of easy magnetization perpendicular to the film surface.

9. The method according to claim 8, wherein the quaternary alloy thin film comprises at least 10 layers each of DyFeCo and TbFeCo.

* * * * *